(No Model.) 2 Sheets—Sheet 2.
H. SCHULZ.
CURRY COMB.
No. 455,548. Patented July 7, 1891.
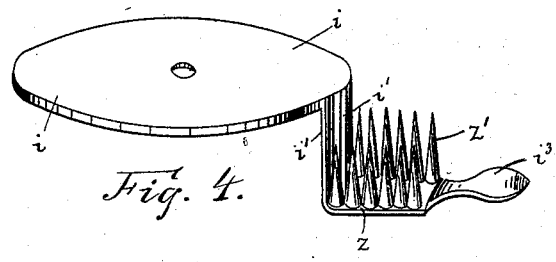
Fig. 4.
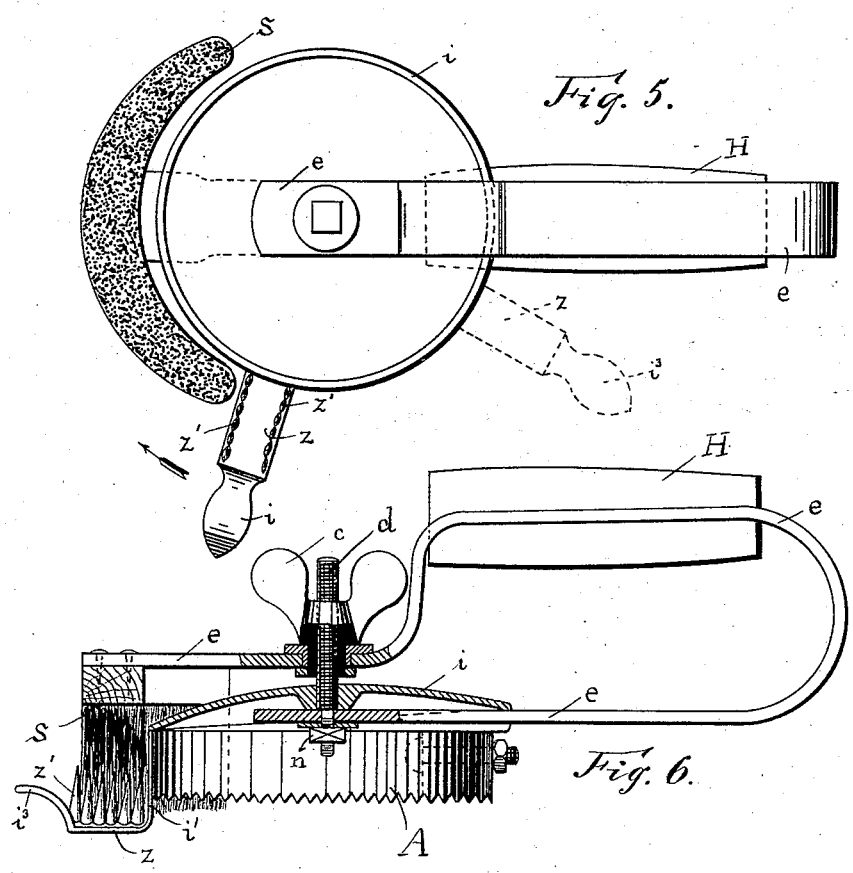
Witnesses:
R. Herpich
E. Schultze
Inventor:
Heinrich Schulz
by Robert Dunlap
Attorney.

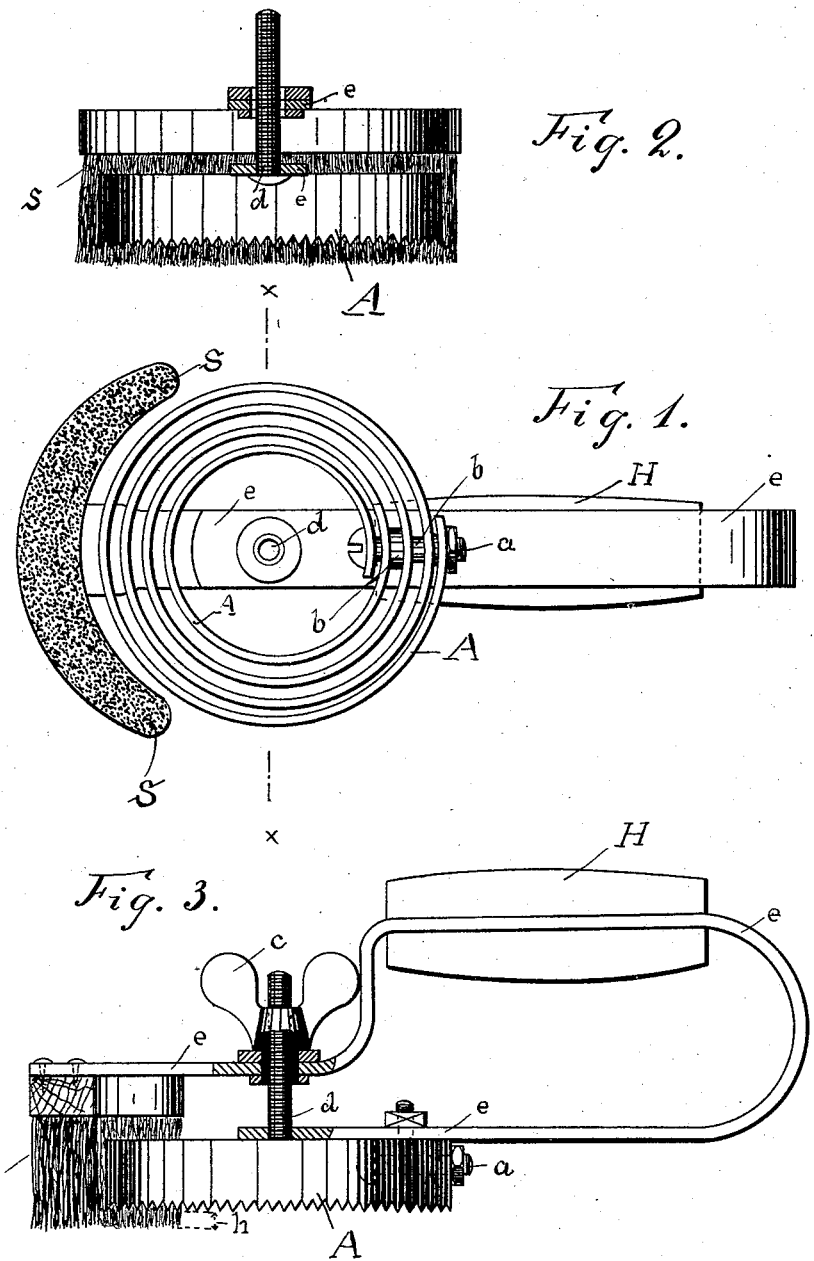

United States Patent Office.

HEINRICH SCHULZ, OF BERLIN, GERMANY, ASSIGNOR OF ONE-HALF TO ERWIN STAHLECKER, OF SAME PLACE.

CURRY-COMB.

SPECIFICATION forming part of Letters Patent No. 455,548, dated July 7, 1891.

Application filed March 23, 1891. Serial No. 386,091. (No model.)

*To all whom it may concern:*

Be it known that I, HEINRICH SCHULZ, a subject of the King of Prussia, German Emperor, and a resident of Berlin, in the Kingdom of Prussia, German Empire, have invented a new and useful Curry-Comb, of which the following is a specification.

My invention relates to a curry-comb wherein the spiral scraper is provided with a sector-shaped brush, being connected therewith in such a manner as to allow the teeth of the comb all in one to come into action. This is a great improvement on curry-combs hitherto in use, the manipulation of which, if not very skillful, is dangerous in so far as by edging the comb the pressure applied will concentrate itself at one point and the skin of the horse is naturally most severely injured. It is therefore of great importance in handling my new comb that the under surface of the same shall always come in parallel to such surface, where it is pressed upon by the elastic support or connection of brush and comb. In order to catch up the dust created by the teeth, my new curry-comb is provided with a disk slightly curved, which completely covers the spiral on top. To this disk there is a scraper fastened to clean the brush whenever required.

In order to have my invention well understood, I give a good illustration of the same on the accompanying drawings, in which—

Figure 1 is a view from underneath showing the curry-comb and brush without the disk and brush-cleaner mentioned above. Fig. 2 is a section drawn on the line $x\,x$ of Fig. 1. Fig. 3 is a side view of the same. Fig. 4 is a perspective view of the disk and brush-cleaner. Fig. 5 is a view from underneath of the implement without showing the spiral comb; Fig. 6, a longitudinal section of the complete article.

A is a comb consisting of the well-known spirally-shaped blade, which may be of iron, steel, or other metal, in which the teeth are filed in or cut or punched out. The spiral is held together by a screw $a$ and washers $b$, one of which is prolonged out on top and is riveted to a flat bar $e$. This flat bar is long enough to be bent round upward to form part of a handle H, and then to be bent down again and to carry the sector-shaped brush S. The other end of bar $e$ projects over the center of the spiral, where a stud $d$ is riveted or screwed onto it. The stud projects through the upper end of the flat bar $e$ as well, is provided with a thread, and carries a wing-nut $c$, by which means the two ends of bar $e$ may be adjusted nearer to or farther away from each other. The sector-shaped brush S is provided with hairs of such length as to project out a certain distance $h$ longer than the teeth of the comb. The distance $h$ may be adjusted by turning the wing-nut $c$, and this, as well as the flexibility of the bent flat bar $e$, will give to the spiral comb the elastic support required. Instead of the wing-nut $c$ I may apply two ordinary nuts—one above and one below.

The dust-catching disk $i$ and the brush-cleaner $z$ are shown in detail in Fig. 4 and in combination with the parts of the implement in Figs. 5 and 6. The disk $i$ is somewhat bent and a little larger in diameter than the spiral comb, which it covers by being held in such a position loosely by the stud $d$, which in this case is fastened to the lower end of the bar $e$ by a small screw and nut $n$, as may be seen in Fig. 6. In order to remove or replace the disk $i$, the nut $n$ may be screwed off and the two ends of the bent bar $e$ drawn asunder so far as to allow the disk to slip in or out. This being done, the nut $n$ is to be put on again. The brush-cleaner $z$ is fixed to the disk $i$ by a connecting-piece $i'$ and carries one or more rows of long teeth $z'$, and is also provided with a small handle $i^3$. The teeth have such a position as to pass in between the hairs of the brush when drawn across by the handle $i^3$, which manipulation will suffice to perfectly clean the brush. The disk $i$ being not quite parallel to the spiral comb, by laying on the one side against the flat bar $e$ enables the brush-cleaner to be drawn higher up when turned toward the handle H, so as to come out of the range of the comb-teeth when the curry-comb is made use of.

Having thus fully described the nature of my invention, what I desire to secure by Letters Patent of the United States is—

1. In a curry-comb, the combination of a sector-shaped brush S, the bent flat bar $e$, provided with a handle H, the spiral comb A, the stud $d$, being centrally to the spiral comb, fastened to one end of the flat bar $e$ and projecting through the other end of the same, and being provided with a nut $c$, so as to adjust the projection of the brush from the comb, as and for the purpose set forth.

2. In a curry-comb, the combination of the sector-shaped brush S, the bent flat bar $e$, the spiral comb A, the stud $d$, being centrally to the spiral comb, fastened to one end of the flat bar $e$ and projecting through the other end of the same, and being provided with a nut $c$, so as to adjust the projection of the brush from the comb, the disk $i$, and the brush-cleaner $z$, as and for the purpose set forth.

In testimony whereof I have signed this specification in the presence of two subscribing witnesses.

HEINRICH SCHULZ.

Witnesses:
FR. SPERLING,
R. HERPICH.